US006909803B2

(12) United States Patent
Uchida

(10) Patent No.: US 6,909,803 B2
(45) Date of Patent: Jun. 21, 2005

(54) TEXT COLOR DETECTION FOR COPIER IMAGE PROCESSING

(75) Inventor: Yoshiki Uchida, Newport Beach, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 791 days.

(21) Appl. No.: 09/745,772

(22) Filed: Dec. 22, 2000

(65) Prior Publication Data

US 2002/0081023 A1 Jun. 27, 2002

(51) Int. Cl.$^7$ ................................................. G06K 9/00
(52) U.S. Cl. ..................................... 382/165; 382/167
(58) Field of Search ............................... 382/162–167; 358/518–530

(56) References Cited

U.S. PATENT DOCUMENTS

| | | | | |
|---|---|---|---|---|
| 5,420,938 A | * | 5/1995 | Funada et al. ............... | 382/173 |
| 5,488,670 A | * | 1/1996 | Suzuki et al. ................ | 382/165 |
| 5,751,921 A | * | 5/1998 | Fujimoto ..................... | 358/1.9 |
| 5,768,403 A | | 6/1998 | Suzuki et al. ................ | 382/165 |
| 5,838,817 A | * | 11/1998 | Funada ........................ | 382/166 |
| 5,883,973 A | | 3/1999 | Pascovici et al. ........... | 382/176 |
| 5,920,655 A | * | 7/1999 | Makita et al. ............... | 382/272 |
| 5,946,414 A | | 8/1999 | Cass et al. ................... | 382/183 |
| 5,949,555 A | | 9/1999 | Sakai et al. .................. | 358/462 |
| 5,956,468 A | | 9/1999 | Ancin ......................... | 395/109 |
| 5,995,653 A | | 11/1999 | Reed et al. .................. | 382/162 |
| 6,038,340 A | | 3/2000 | Ancin et al. ................ | 382/167 |
| 6,072,941 A | | 6/2000 | Suzuki et al. ............... | 395/109 |
| 6,148,102 A | * | 11/2000 | Stolin .......................... | 382/164 |
| 6,631,207 B2 | * | 10/2003 | Hirota et al. ................ | 382/167 |

* cited by examiner

Primary Examiner—Jingge Wu
(74) Attorney, Agent, or Firm—Fitzpatrick, Cella, Harper & Scinto

(57) ABSTRACT

An image process comprising inputting image data, performing block selection of objects in the input image data, discriminating whether each block of the input image data is character or non-character image data, detecting a feature of each block of the character data without utilizing edge portions of the character data, performing an image process on each block of the character data based on the detected feature of the character data, and performing an image process on the non-character image data, and outputting the processed image data. The detected feature of the character data may be a foreground or background color of the character data. The block selection detects edge portions of the character data and utilizes portions of the character data internal to the edge portions in detecting the feature of the character data. The foreground color detection process may comprise converting input color component values of the character data to color space values, determining an average color space value from the converted color space values, comparing the average color space value to a threshold value, and determining whether or not the character data is black based on the comparison result. Additionally, the input step may comprise selecting a processing mode of the image data based on a type of image being input, wherein each block of the input image data is discriminated based on the selected processing mode. The processing mode may include one of a text mode, a photo/illustration mode, a magazine mode and a mixed document mode.

44 Claims, 9 Drawing Sheets

325

The Color Output Users Need, Even Outside of the Office

Plainly Canon's digital imaging technology with networking technology turns any business service center or print shop into a sophisticated imaging station providing high-quality printouts whenever and wherever they are needed. Facilities such as these can handle even the most involved printing needs. The service center where you place the order can supply diverse web and pictorial data, can automatically bind magazines and catalogs, and can provide the document processing that you need for work.

In short, any service center prints and binds anything—any time and any way that you want

FIGURE 4A

TEXT COLOR DETECTION FOR COPIER IMAGE PROCESSING

BACKGROUND OF THE INVENTION

1. Field of the Invention

The present invention relates to image processing in digital color copiers. More specifically, the present invention relates to image processing to discriminate whether input image data is character data or non-character image data by performing block selection and performing an image process on the character data.

2. Description of the Related Art

Copy machines contain an image processing unit that includes a scanner which scans an input image. When the input image is scanned, the conventional processing unit detects, on a pixel-by-pixel basis, whether input data is text or a continuous tone image by detecting edges of text objects as well as the color of the text objects. The image processing unit then applies an appropriate image process to the contents of the input image based on the type of image data detected. For example, if black text is detected, the edge detection process may result in application of an edge enhancement process that applies only black toner in order to sharpen the output image by making the edge clearer. If a continuous tone image area is detected, a smoothing process may be applied to smooth the rich colored output image.

However, such conventional image processes have drawbacks in that, since the color and edge detection processes are performed on a pixel-by-pixel basis, it is not easy to detect the color of text objects. For instance, the edge portion of a text object is generally neither black nor white in detail, but rather, generally appears to have some chroma, i.e. it looks like a colored pixel. Thus, some black text objects may be misjudged as being non-black. In order to address this misjudgment, conventional systems apply a threshold test for determining whether or not an object is black. The threshold value can be adjusted to reduce the misjudgment, depending on the precision of the scanner. However, one drawback with this technique is that low saturation colored text is often detected as black text.

Another drawback of performing the processing on a pixel-by-pixel basis is that the image processing unit generally assumes that dark colors are foreground colors and light colors are background. However, where the text is actually white with a dark background color, conventional copiers have trouble performing text detection.

Additionally, in performing the image processing, conventional copiers provide pre-set functions for a user to select the type of original document being scanned so as to set a type of image recognition process to be used in scanning the input image. That is, based on the pre-set function selected, the image recognition process will be pre-set to detect text only, continuous tone images, or a combination of both, thereby reducing misjudgment of text and non-text data during the detection process. However, the conventional functions generally result in enabling or disabling text detection, preparing appropriate parameters for text detection, preparing appropriate parameters of an image filter and RGB to CMYK conversion, and selecting printout resolution which are not conducive for performing image processing by block selection.

SUMMARY OF THE INVENTION

The present invention addresses the foregoing by utilizing an image processing technique that processes input image data by performing block selection rather than performing a process on a pixel-by-pixel basis. According to the invention, the objects of the input image are detected by block selection and are discriminated as being text or not-text. Then, for each text object, the foreground color is determined using the non-edge foreground text data. After collecting the foreground data, the average foreground color is calculated in a color space such as Lab color space. Utilizing the average color information, a determination is made whether the text object is black or not.

As a result of the foregoing, the misjudgment of color text as black text, and vice versa, is reduced. Moreover, since the foreground and background colors are detected, a different image process can be applied depending upon which background and foreground colors are detected.

Thus, according to one aspect, the invention processes image data by inputting image data, performing block selection of objects in the input image data, discriminating whether each block of the input image data is character or non-character image data, detecting a feature of each block of the character data without utilizing edge portions of the character data, performing an image process on each block of the character data based on the detected feature of the character data, and performing an image process on the non-character image data, and outputting the processed image data. The block selection may be performed by an algorithm that detects edge portions of the character data and utilizes portions of the character data internal to the edge portions in detecting the feature of the character data. The detected feature of the character data may be a foreground color of the character data or a background color of the character data. The foreground color detection process may be performed by converting input color component values of the character data to color space values, determining an average color space value from the converted color space values, comparing the average color space value to a threshold value, and determining whether or not the character data is black based on a result of the comparison.

As a result of the foregoing, the misjudgment of low saturation color text as black, and the misjudgment of black text as color text is reduced since the unreliable edge portions of the character data are not considered in the color detection process. That is, where the edge portions may normally exhibit some chroma due to printing with process black ink, the process of the present invention removes the edge portions having chroma from the color detection process and instead, utilizes the more reliable internal portions. Additionally, since the foreground and background colors are detected, a different image process can be applied depending upon the detected background and foreground colors.

In another aspect, the process of inputting the image data may comprise selecting a processing mode of the image data based on a type of image being input. Each block of the input image data is discriminated based on the processing mode selected. The processing mode selected may be one of a text mode, a photo/illustration mode, a magazine mode and a mixed document mode. The foregoing modes assist in the block selection processing of image data and can accelerate the processing of the image data by pre-setting the processes to be performed on the image data.

In a further aspect, the invention may apply a more intelligent rule by performing block detection on a word-by-word basis. Thus, the character data may comprise each of a plurality of characters of a word and the detected feature of each character in the word may be compared with one another. This process provides for correcting the detected color of some of the letters based on the detected color of other letters. For instance, if some letters in a word are detected as being black text while other letters are detected as being low saturation color text, an image process to correct the low saturation color text to be black text may be applied.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF DRAWINGS

FIGS. 4A to 4D depict examples of various types of documents.

DETAILED DESCRIPTION OF THE PREFERRED EMBODIMENT

Figure 1:
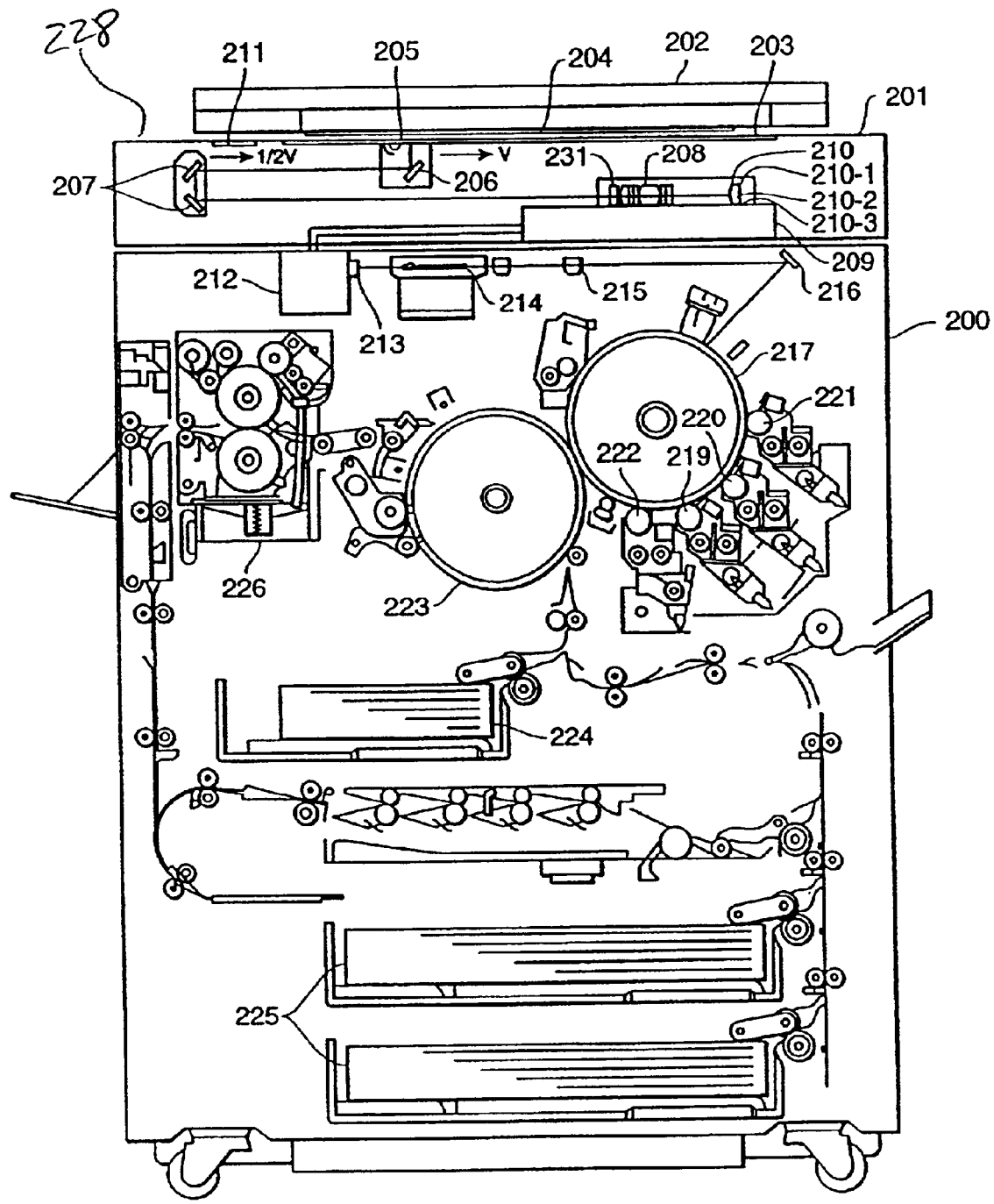
FIG. 1 is a sectional view of a color copier according to an embodiment of the present invention.

FIG. 1 shows a sectional view of an image processing apparatus according to one embodiment of the present invention. In the apparatus of FIG. 1, image scanner 201 reads an original document, and digitally processes read pixel data of the original document into digital signals. Printer 200 then prints out an image corresponding to the original document read by image scanner 201 on a printing sheet in full color.

In image scanner 201, original document 204 is set on a platen glass, covered with a document cover 202, and exposed by halogen lamp 205. Reflected light from original document 204 is further reflected by mirrors 206 and 207, then focuses on CCD 210 for identifying R, G, and B signals after passing through the lens 208. It should be noted that lens 208 is covered by infrared filter 231.

In the preferred embodiment, each row of sensors in CCD 210 for reading respective color components is composed of 5000 pixels, thus CCD 210 an read across the shorter side of an A3-sized original, namely 297 mm, at 400 dpi resolution. CCD 210 separates color information of original document 204 into full-color information of R, G and B components, and converts the full-color information into color signals.

In addition, standard white board 211 generates correction data for correcting read data by R, G, B photo sensors 210-1 to 210-3 of CCD 210. Standard white board 211 has uniform reflection characteristics in the visible light range, and appears white. After correcting the data, CCD 210 then sends the signals to signal processing unit 209.

It should be noted that, halogen lamp 205 and mirror 206 move at speed v, and mirror 207 moves at speed (½)v in a perpendicular direction with respect to an electrical scanning direction of CCD 210 (a main scanning direction). The entire area of original document 204 is scanned in this manner.

Further, in signal processing unit 209, the read signals are electrically processed and separated into color components of magenta (M), cyan (C), yellow (Y), and black (Bk), then sent to printer 200. for each scanning operation by image scanner 201, one of the color component data of M, C, Y, and Bk is sent to printer 200. Thus, by scanning original document 204 four times, one color image is formed.

Image scanner 201 also includes control panel 228. Control panel 228 includes various buttons as well as a display panel that provides a user with the ability to select and set various image processing options. The display panel may be a touch panel display from which the user can select processing options by touching a desired option on the display. An example of such a touch panel display depicting various processing options is shown in FIG. 3.

Figure 3:
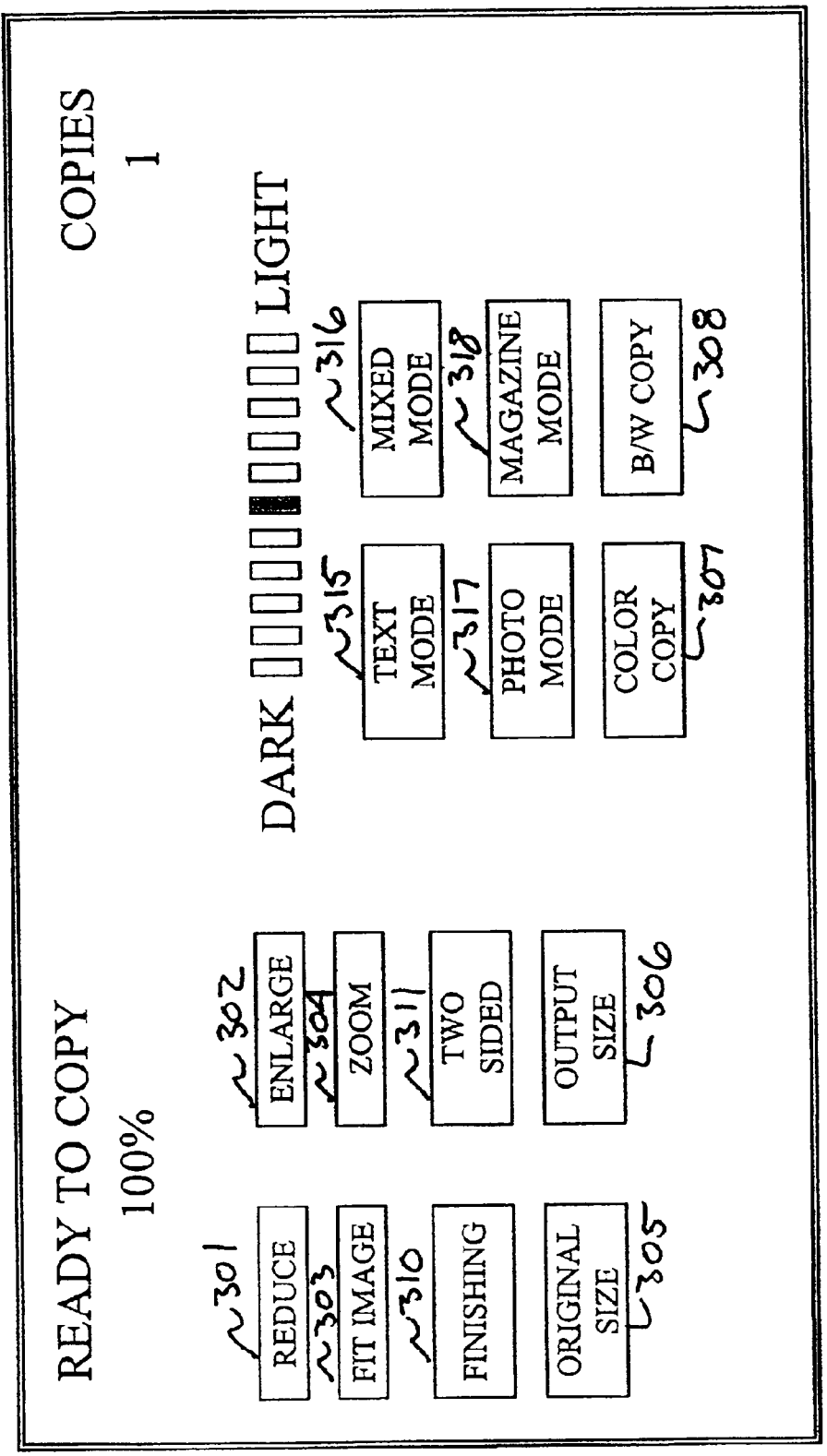
FIG. 3 depicts a display panel for setting image processing options according to the invention.

As seen in FIG. 3, touch panel display 300 may include an option to reduce 301, enlarge 302, or to fit the image on the output paper size (fit image 303). Additionally, using zoom 304, a user can set the output image to a specified percentage of the original document. Options to select an original document size 305 (e.g. A3, A4, Letter, Legal, etc.), select an output document size 306, and to select a color image 307 or a greyscale image 308 may also be included in display 300. Further, finishing options 310 such as collating and stapling, and two sided copying 311 may be included.

In the present invention, additional processing options may include selecting the type of image contained in the input document (i.e. text mode 315, mixed image mode 316, photo mode 317 or magazine mode 318). In FIG. 3, processing modes 315 to 318 provide a way for the user to preset an image process in image scanner 201. That is, depending on the type of data contained on the original document, the user can select an image processing mode that assists in the block selection processing of the document. For instance, if the document contains only text such as document 325 shown in FIG. 4A, the user can select text mode 315 so that image scanner 201 is preset to perform block selection of text only. In the absence of selecting text mode 315, image scanner 201 normally performs a block selection recognition process to detect the type of data contained in the document and then processes text blocks and image blocks accordingly. However, the recognition portion of the block selection process increases the processing time. Therefore, selecting a text only option expedites the recognition portion of the block selection process by informing image scanner 201 that the original document only contains text. As a result, the image scanner performs the block selection knowing that the original document only contains text and therefore the image scanner does not have to perform processes that are required for images.

Figure 4B:
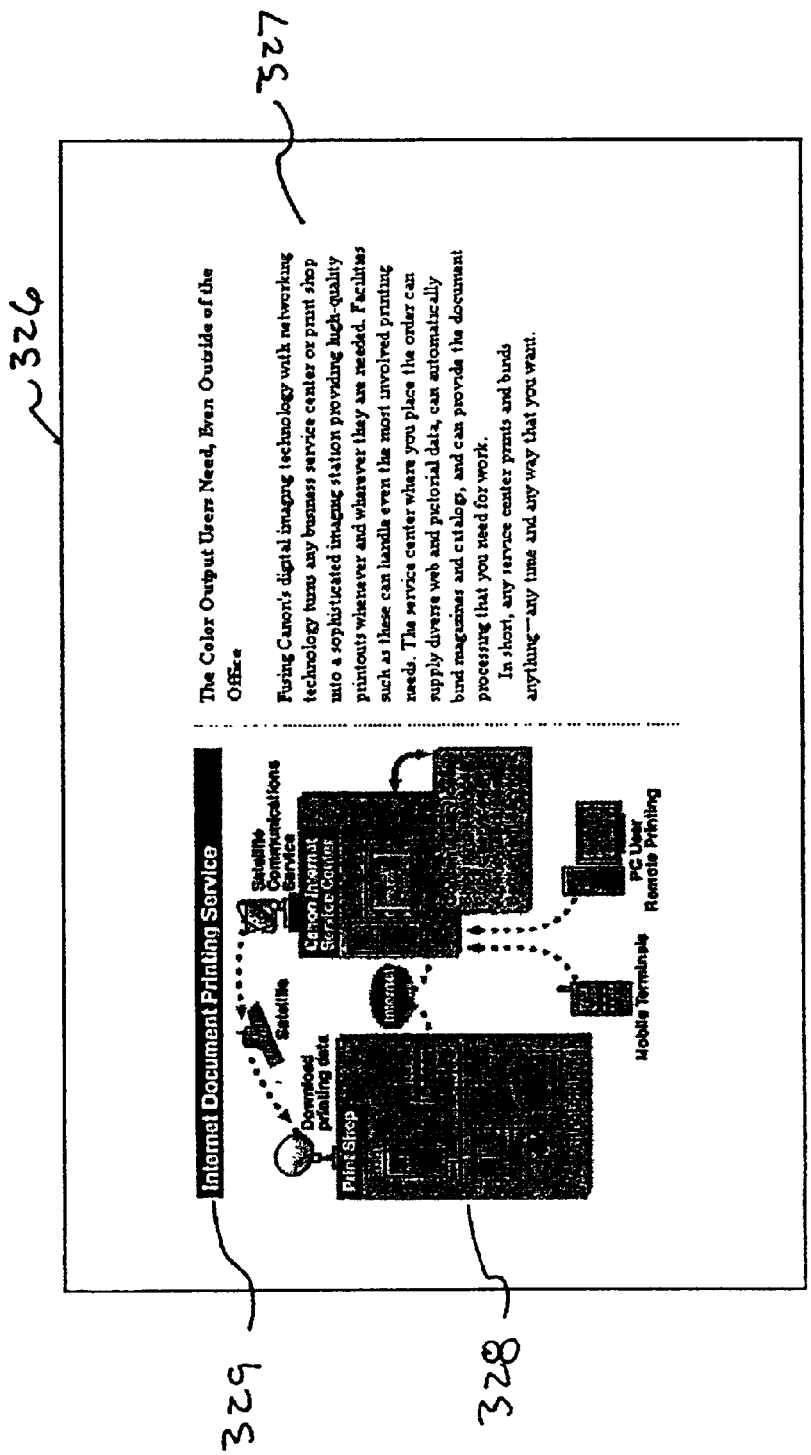

As stated above, in addition to text mode 315, the present invention also provides for mixed document mode 316. An example of a mixed document is shown in FIG. 4B. As seen in FIG. 4B, mixed document 326 contains text data 327 and 329, and image data 328. When mixed mode 316 is selected, image scanner 201 knows that the original document contains both text data and image data and therefore, when the block selection process is performed, image scanner 201 will process the text blocks and the image blocks accordingly. As stated above, the invention provides for processing text having a black foreground and a light background as well as text having a light foreground and a dark background. FIG. 4B depicts the both types of text data, the former being text data 327 and the latter being text data 329.

Figure 4C:

Two additional processing modes provided for are photo mode 317 and magazine mode 318. FIG. 4C depicts an example of an original document comprising a photograph for which photo mode 317 may be selected. When photo mode 317 is selected, image scanner 201 is preset to process an original document that contains an image only and does not contain any text. Therefore, the block selection process is not needed since image scanner 201 is set to process only an image and does not detect text data.

Figure 4D:
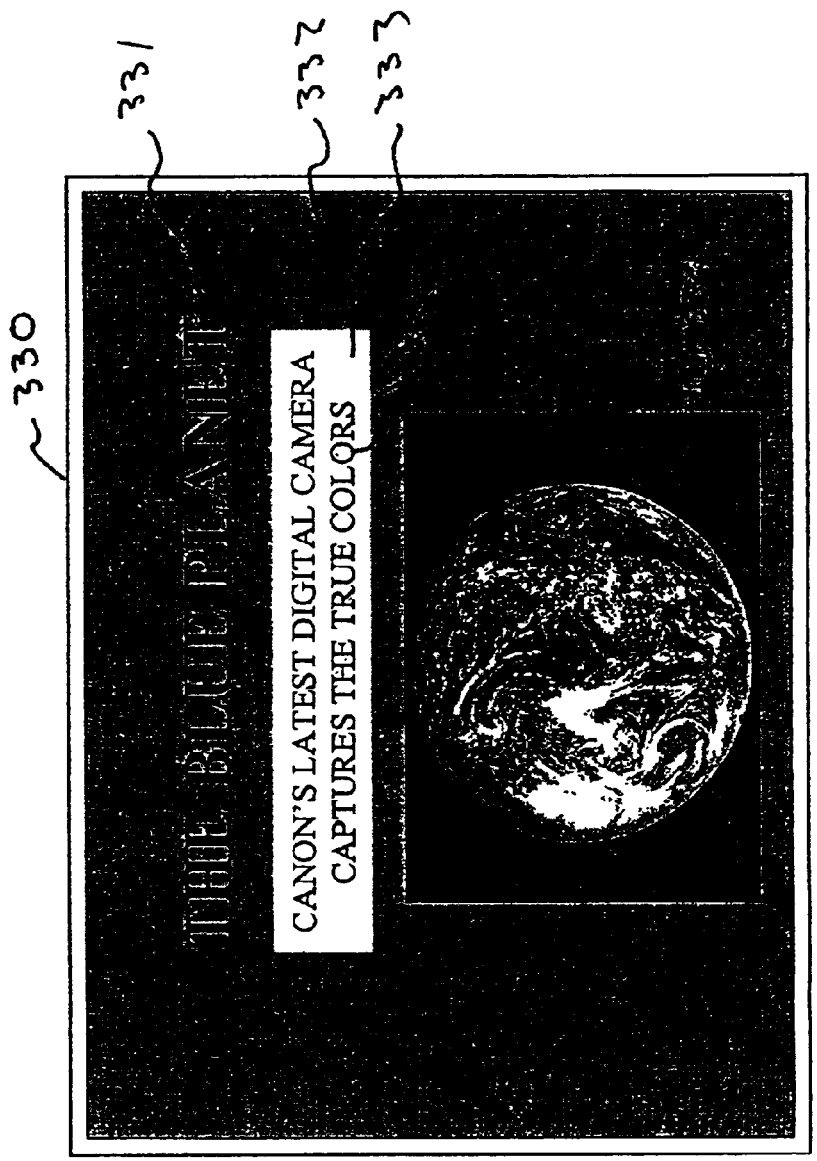

FIG. 4D depicts an example of an original document for which magazine mode 318 may be selected. As seen in FIG. 4D, a magazine type original document may be multilayered in the sense that text data may be included within different background colors. For instance, document 330 of FIG. 4D may include text 331 and image 334 on a large blue background 332, as well as text 335 on a smaller yellow background 333. To detect such a multilayered document, selecting magazine mode 318 causes image scanner 201 to first detect the large blue background area 332 and then to detect the smaller yellow background area 333. Thus, utilizing magazine mode 318 of the present invention reduces the misjudgment of text and images in multilayered magazine type original documents.

Returning to FIG. 1, in printer 200, each image signal of M, C, Y, and BK from image scanner 201 is sent to laser driver 212. Laser driver 212 drives semi-conductor laser 213 by signals modulated on the basis of the image signals. The laser beam scans electrostatic drum 217 via polygon mirror 214, f-θ lens 215, and mirror 216.

The developer unit is composed of magenta developer 219, cyan developer 220, yellow developer 221, and black developer 222. These four drums touch electrostatic drum 217, are configured to turn therewith, and develop latent images of M, C, Y and Bk formed on electrostatic drum 217 with the corresponding color toner. Further, transfer drum 223 attracts a paper sheet fed from paper cassette 224 or 225, and a toner image developed on electrostatic drum 217 is transferred onto the paper sheet. The paper sheet is then ejected after passing through fixing unit 226.

Figure 2:
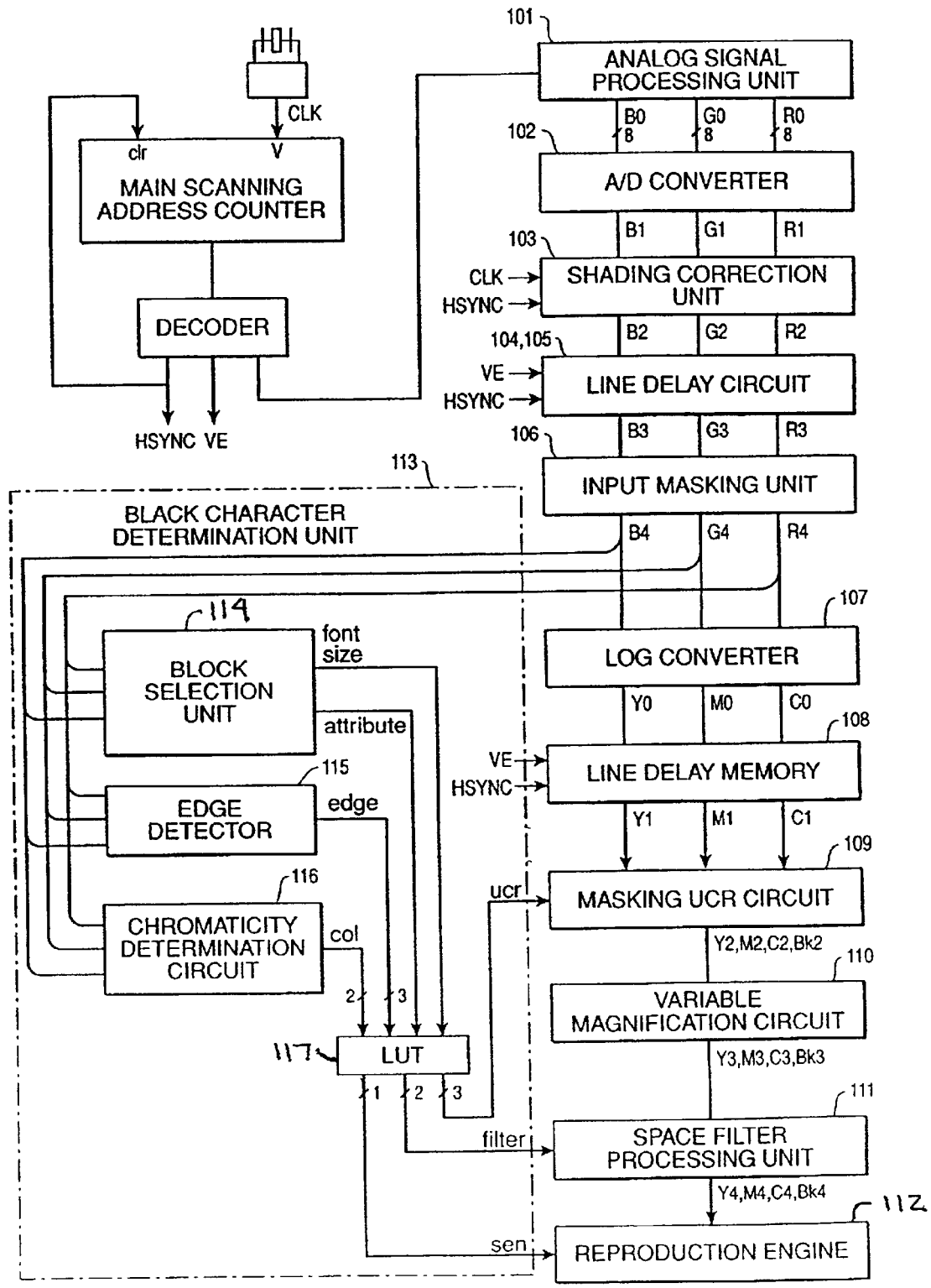
FIG. 2 is a block diagram showing an image processing unit according to the present invention.

FIG. 2 is a block diagram showing an image processing flow according to the present invention. As shown in FIG. 2, image signals output from a CCD are input to analog signal processing unit 101, wherein the signal is processed with gain and offset adjustment. Next, each of the R, G and B signals is converted into an 8-bit digital image signal, R1, G1, and B1, respectively, by A/D converter 102. These signals are then input to shading correction circuit 103 for application of shading correction to each signal. Line delay circuits 104 and 105 are used to compensate for spacing of sensors within the CCD so as to match timing between each of the R1, G1 and B1 signals such that, after line delay circuit 105, values of the R, G and B signals at a same point in time represent a same pixel.

Input masking unit 106 converts a reading color space, determined by color decomposition characteristics of the CCD, into a standard color space, and log converter 107 converts luminance signals R4, G4 and B4 into density signals C0, M0 and Y0. The density signals are delayed by line delay memory 108 until determination signals UCR (under color removal), FILTER and SEN can be generated.

After delay of the signals by line delay memory 108, masking UCR circuit 109 extracts black signals from the density signals using the UCR signal and variable magnification circuit 110 expands and compresses an image signal and a black character determination signal in the main scanning direction. Space filter processing unit 111 performs filtering using the FILTER signal and the resulting frame-sequential image signals M4, C4, Y4 and Bk4 are sent to reproduction engine 112 along with the SEN signal, which determines the resolution at which the image is output.

The UCR, FILTER and SEN signals are output from black character determination unit 115. Specifically, the UCR signal generated by black character determination unit 113 has a value from 0 to 7 indicating, from more black to less black, an amount of black component which should be removed from signals Y1, M1 and C1 by masking UCR circuit 109 to produce signal Bk2. The FILTER signal produced by black character determination unit 113 is a 2-bit value in which values 0, 1, 2 and 3 indicate smoothing, strong edge enhancement, medium edge enhancement, and weak edge enhancement, respectively. Accordingly, the FILTER signal is input to space filter processing unit 111 to control an amount and type of filtering applied to signals Y3, M3, C3 and Bk3.

The SEN signal is output from black character determination unit 113 to reproduction engine 112, and is a 1-bit signal in which a 0 value indicates to engine 112 that printing should proceed at 200 lines per inch resolution, and the value 1 indicates that 400 lines per inch printing is required.

The values of UCR, FILTER and SEN are outputs of look-up table (LUT) 117, which receives signals indicating a width of a character containing a subject pixel, a proximity of the subject pixel to an edge of a character, and a chromaticity of the subject pixel. Therefore, the output values of UCR, FILTER, and SEN are calculated for each subject pixel and are determined based on a detected character width, edge proximity and chromaticity corresponding to the pixel according to relationships specified by the LUT.

For example, a FILTER signal value of 1 is used for a subject pixel which is located near to an edge and is within a small, black character. In another example, the SEN signal is assigned a value of 0 (corresponding to 200 lines per inch resolution) in a case that the subject pixel is not near an edge and is included in a very thick area, since larger toner dots, which provide more toner per unit area than larger dots, generate a better halftone image.

Block selection unit 114 outputs signals representative of font size and attribute. Although block selection unit 114 appears in FIG. 2 as a hardware unit, it should be noted that the block selection processing described herein and in the applications incorporated by reference herein may be embodied in software or in a combination of software and hardware. Moreover, block selection unit 114 need not be an element of black character determination unit 113.

In operation, block selection unit 114 performs block selection processing on input image data to determine a font size of text in the data as well as attributes of objects within the data. More particularly, for each pixel in input image data, block selection unit 114 assigns a font size of text, if any, in which the pixel is located and an attribute for an object in which the pixel is located.

LUT 117 takes as input signals font size, attribute, edge and col, and outputs signals UCR, FILTER and SEN. The detailed contents of LUT 117 are described in more detail in co-pending U.S. patent application Ser. No. 09/458,941, entitled "Block Selection-Based Image Processing", filed Dec. 10, 1999, the contents of which are incorporated by reference as set forth in full herein.

Figure 5:
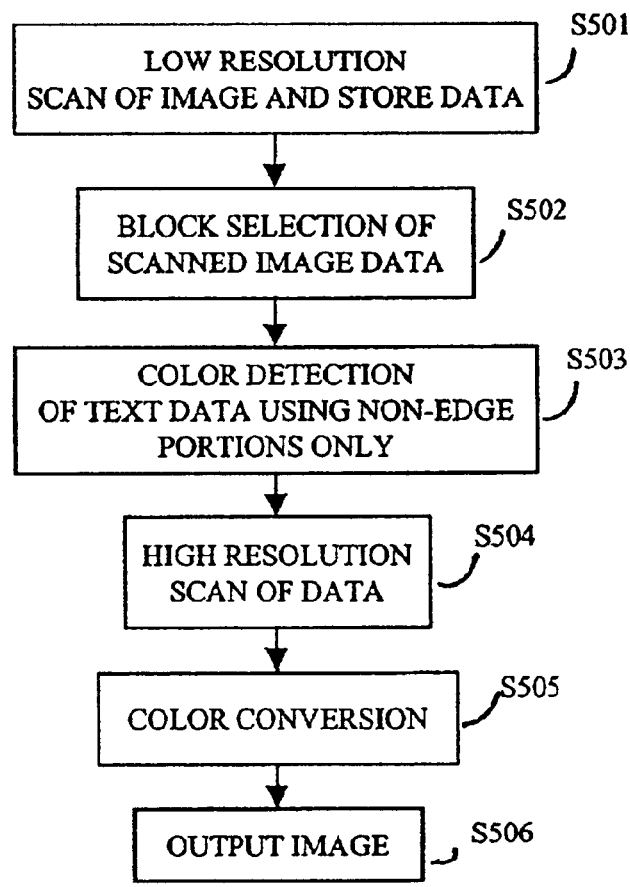
FIG. 5 depicts process steps of an image process according to the invention.

FIG. 5 depicts process steps for performing an image process in a color digital copier according to the invention. In step S501, image scanner 201 performs a low resolution scan of an original document and stores the scanned data. The low resolution scanned data is then subjected to a block selection process (step S502) to detect the various type of data contained in the original document and to assign attributes to the blocks. That is, the block selection process detects and identifies blocks of text data and blocks of image data and assigns attributes to each block. The block selection process may be similar to that described in co-pending U.S. patent application Ser. No. 09/458,941, entitled "Block Selection-Based Image Processing", or any other type of block selection process that identifies text, including edge portions, as well as image data.

Figure 6:
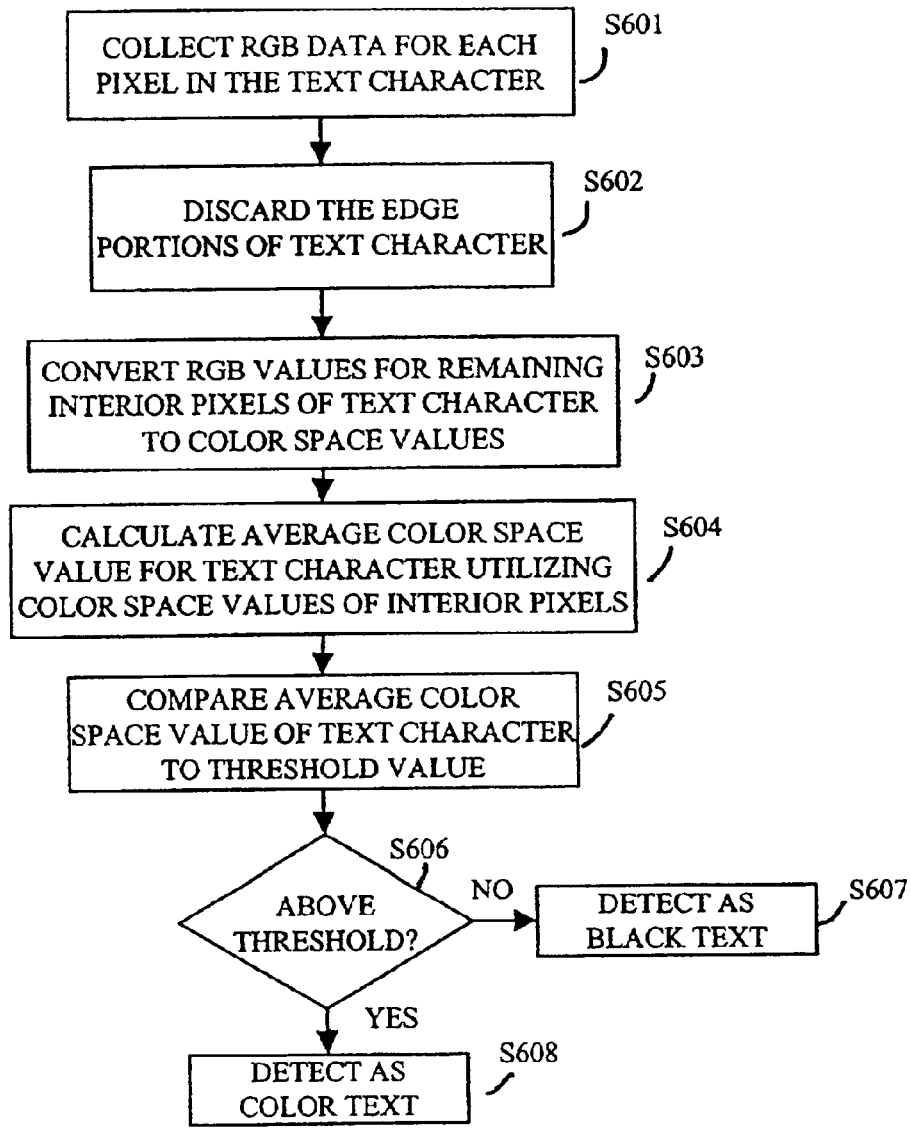
FIG. 6 depicts process steps of a text color detection process according to the invention.

In step S503, a text color detection process is performed on the text blocks. That is, the text blocks detected in the block selection process of step S502 are subjected to the text color detection process of step S503. FIG. 6 depicts process steps for the color detection process of step S503. In step S601, the color detection process collects the red (R), green (G) and blue (B) data read by the CCD in the low resolution scan of step S501 for each pixel in the text character. The edge portions of the text characters detected in the block selection process are discarded (step S602) from the remainder of the color detection process and only the remaining interior pixels of the text character are processed. The RGB values of the remaining interior pixels of the text characters are converted to color space values, such as Lab color space (step S603). The converted color space values for each text character are averaged (step S604) to calculate an average color space value for each text character. In step S605, and the average value of each text character is compared to a threshold value. If the average color space value of the text character is below the threshold (determination made in step S606), then the text character is detected as black data (step S607). If the average color space value of the text character is above the threshold, then the text character is detected as color text (step S608). Where the text data is detected as black, then a process to apply only black toner to the text data can be performed and processes to sharpen the text data can also be applied.

As can be seen from the process steps of FIG. 6, the text color detection process detects the color of the text character on a character by character basis. This in contrast to conventional methods which process text characters on a pixel by pixel basis. That is, in conventional text color detection processes, the process determines whether each pixel in the text character is black or not. Such conventional processes may result in some of the pixels in a single text character being detected as being black, while other pixels in the same text character being detected as low saturation color text. This color detection process results in artifacts being depicted in the text characters due to the discrepancy in the color detection process. In contrast, the text color detection process of the present invention determines color space values for all of the interior pixels in the text character (discarding the edge portions), then averages the color space values of the interior pixels to arrive at an average color space value for the entire text character. Then, utilizing the average color space value, the present invention detects whether the entire character is black or not. Thus, if the character is detected as being black, each pixel in the text character will be processed as a black pixel and therefore artifacts that occur in the conventional process are removed.

Returning to FIG. 5, after the color detection process of step S503, a second high resolution scan is performed for the copying process (step S504). Then, in step S505, a color conversion process is performed to convert the high resolution data from RGB values to CMYK values for printing by printer 200. Finally, the image is processed and output by printer 200 as described above (step S506).

As can be seen from the process steps of FIG. 6, a more accurate detection of white text on a black background, such as text data 329 of FIG. 4B, is provided for since the edge portions are not considered in the text color detection process. Additionally, since the edge portions are discarded, a more accurate detection of the text color in magazine type original documents is provided for since the error caused by the blending of the background image with the edge portions is removed.

The present invention may also apply a more intelligent text color detection rule. In this regard, the process steps of FIG. 6 may include additional steps to compare the detected color of each character in a word with one another. That is, once the process has detected that a character is either color text or black text, additional steps to compare each character in a word with one another for consistency among the letters could be applied. This process comprises performing block selection on a word-by-word basis and comparing the individual characters in the word block with one another. Thus, if individual characters of the word are detected as having different colors (i.e. some letters are detected as black while others are detected as low saturation color), the low saturation color characters can be corrected to be black text so that only black toner is applied to all of the letters in the word.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. An image processing method for an image processing apparatus, comprising the steps of:
   inputting image data;
   performing block selection of objects in the input image data;
   discriminating whether each block of the input image data is character or non-character image data;
   detecting a color of each block of character data without utilizing edge portions of the character data;
   performing an image process on each block of the character data based on the detected color of the character data;
   performing an image process on the non-character image data; and
   outputting the processed image data.

2. A method according to claim 1, wherein the detected color of the character data is a foreground color of the character data.

3. A method according to claim 1, wherein the detected color of the character data is a background color of the character data.

4. A method according to claim 1, wherein the image process performed on the non-character image data is a smoothing process, and wherein the image process performed on each block of the character data is an edge enhancement process.

5. A method according to claim 1, wherein a block selection algorithm performs the block selection and detects edge portions of the character data and utilizes portions of the character data internal to the edge portions in detecting the color of the character data.

6. A method according to claim 1 further comprising performing color conversion processing of the image data before the outputting step.

7. A method according to claim 2, wherein the foreground color detection process comprises:

converting input color component values of the character data to color space values;

determining an average color space value from the converted color space values; and comparing the average color space value to a threshold value.

8. A method according to claim 7, further comprising determining whether or not the character data is black based on a result of the comparing step.

9. A method according to claim 1, wherein the input step comprises selecting a processing mode of the image data based on a type of image being input, wherein the discriminating step discriminates each block of the input image data based on the selected processing mode.

10. A method according to claim 9, wherein the processing mode includes one of a text mode, a photo/illustration mode, a magazine mode and a mixed document mode.

11. A method according to claim 1, wherein the character data comprises each of a plurality of characters of a word and the detecting step detects a color of each character in the word and compares the detected colro of each character with one another.

12. An image processing apparatus, comprising:

an input device for inputting image data; and an image processing device that (a) performs block selection of objects in the input image data, (b) discriminates whether each block of the input image data is character or non-character image data, (c) detects a color of each block of the character data without utilizing edge portions of the character data, (d) performs an image process on each block of the character data based on the detected color of the character data, and (e) performs an image process on the non-character image data; and an output device that outputs the processed image data.

13. An apparatus according to claim 12, wherein the detected color of the character data is a foreground color of the character data.

14. An apparatus according to claim 12, wherein the detected color of the character data is a background color of the character data.

15. An apparatus according to claim 12, wherein the image process performed on the non-character image data is a smoothing process, and wherein the image process performed on each block of the character data is an edge enhancement process.

16. An apparatus according to claim 12, wherein a block selection algorithm performs the block selection and detects edge portions of the character data and utilizes portions of the character data internal to the edge portions in detecting the color of the character data.

17. An apparatus according to claim 12, wherein the image processing device further performs color conversion processing of the image data before the processed image data is output.

18. An apparatus according to claim 13, wherein the foreground color detection process comprises:

converting input color component values of the character data to color space values;

determining an average color space value from the converted color space values; and comparing the average color space value to a threshold value.

19. An apparatus according to claim 18, further comprising determining whether or not the character data is black based on a result of the comparing step.

20. An apparatus according to claim 12, wherein the input device comprises a mode selection device for selecting a processing mode of the image data based on a type of image being input, wherein the image processing device discriminates each block of the input image data based on the selected processing mode.

21. An apparatus according to claim 20, wherein the processing mode includes one of a text mode, a photo/illustration mode, a magazine mode and a mixed document mode.

22. An apparatus according to claim 12, wherein the character data comprises each of a plurality of characters of a word and the detecting step detects a color of each character in the word and compares the detected color of each character with one another.

23. Computer-executable process steps for performing an image process, comprising the steps of:

inputting image data;

performing block selection of objects in the input image data;

discriminating whether each block of the input image data is character or non-character image data;

detecting a color of each block of the character data without utilizing edge portions of the character data;

performing an image process on each block of the character data based on the detected color of the character data;

performing an image process on the non-character image data; and outputting the processed image data.

24. Computer-executable process steps according to claim 23, wherein the detected color of the character data is a foreground color of the character data.

25. Computer-executable process steps according to claim 23, wherein the detected color of the character data is a background color of the character data.

26. Computer-executable process steps according to claim 23, wherein the image process performed on the non-character image data is a smoothing process, and wherein the image process performed on each block of the character data is an edge enhancement process.

27. Computer-executable process steps according to claim 23, wherein a block selection algorithm performs the block selection and detects edge portions of the character data and utilizes portions of the character data internal to the edge portions in detecting the color of the character data.

28. Computer-executable process steps according to claim 23 further comprising performing color conversion processing of the image.

29. Computer-executable process steps according to claim 24, wherein the foreground color detection process comprises:

converting input color component values of the character data to color space values;

determining an average color space value from the converted color space values; and comparing the average color space value to a threshold value.

30. Computer-executable process steps according to claim 29, further comprising determining whether or not the character data is black based on a result of the comparing step.

31. Computer-executable process steps according to claim 23, wherein the input step comprises selecting a processing mode of the image data based on a type of image being input, wherein the discriminating step discriminates each block of the input image data based on the selected processing mode.

32. Computer-executable process steps according to claim 31, wherein the processing mode includes one of a text mode, a photo/illustration mode, a magazine mode and a mixed document mode.

33. Computer-executable process steps according to claim 23, wherein the character data comprises each of a plurality of characters of a word and the detecting step detects a color of each character in the word and compares the detected color of each character with one another.

34. A computer-readable medium which stores computer-executable process steps for performing an image process, the executable process steps comprising:

inputting image data;

performing block selection of objects in the input image data;

discriminating whether each block of the input image data is character or non-character image data;

detecting a color of each block of the character data without utilizing edge portions of the character data;

performing an image process on each block of the character data based on the detected color of the character data;

performing an image process on the non-character image data so as to output processed image data; and outputting the processed image data.

35. A computer-readable medium according to claim 34, wherein the detected color of the character data is a foreground color of the character data.

36. A computer-readable medium according to claim 34, wherein the detected color of the character data is a background color of the character data.

37. A computer-readable medium according to claim 34, wherein the image process performed on the non-character image data is a smoothing process, and wherein the image process performed on the character data is an edge enhancement process.

38. A computer-readable medium according to claim 34, wherein a block selection algorithm performs the block selection and detects edge portions of the character data and utilizes portions of the character data internal to the edge portions in detecting the color of the character data.

39. A computer-readable medium according to claim 34 further comprising performing color conversion processing of the image.

40. A computer-readable medium according to claim 35, wherein the foreground color detection process comprises:

converting input color component values of the character data to color space values;

determining an average color space value from the converted color space values; and comparing the average color space value to a threshold value.

41. A computer-readable medium according to claim 40, further comprising determining whether or not the character data is black based on a result of the comparing step.

42. A computer-readable medium according to claim 34, wherein the input step comprises selecting a processing mode of the image data based on a type of image being input, wherein the discriminating step discriminates each block of the input image data based on the selected processing mode.

43. A computer-readable medium according to claim 42, wherein the processing mode includes one of a text mode, a photo/illustration mode, a magazine mode and a mixed document mode.

44. A computer-readable medium according to claim 34, wherein the character data comprises each of a plurality of characters of a word and the detecting step detects a color of each character in the word and compares the detected color of each character with one another.

* * * * *